(12) United States Patent
Filippovitch et al.

(10) Patent No.: US 6,381,797 B1
(45) Date of Patent: May 7, 2002

(54) DEVICE FOR MOVING A PIG THROUGH A CONDUIT, SUCH AS A PIPELINE, AND SEALING MEANS FOR A DEVICE OF THIS TYPE

(75) Inventors: Sergei Filippovitch, Thornhill (CA); Jukka Maki, Helsinki (FI)

(73) Assignee: PII Pipetronix GmbH, Stutensee (DE)

( * ) Notice: Subject to any disclaimer, the term of this patent is extended or adjusted under 35 U.S.C. 154(b) by 0 days.

(21) Appl. No.: 09/552,798

(22) Filed: Apr. 20, 2000

(30) Foreign Application Priority Data

Apr. 23, 1999 (DE) .......................... 199 18 538

(51) Int. Cl.[7] .............................. B08B 9/055
(52) U.S. Cl. ................................ 15/104.061
(58) Field of Search ............... 15/104.061, 104.063, 15/304

(56) References Cited

U.S. PATENT DOCUMENTS

| | | | | |
|---|---|---|---|---|
| 332,910 A | * | 12/1885 | Klein | |
| 934,520 A | * | 9/1909 | Greenan | |
| 1,035,994 A | * | 8/1912 | Mueller | |
| 1,966,819 A | * | 7/1934 | Irvin | |
| 2,328,060 A | * | 8/1943 | Crane et al. | |
| 2,887,118 A | * | 5/1959 | Loeffler et al. | |
| 3,525,111 A | * | 8/1970 | Von Arx | |
| 4,984,322 A | * | 1/1991 | Cho et al. | |
| 5,428,862 A | * | 7/1995 | Sailer | |

* cited by examiner

*Primary Examiner*—Terrence R. Till
(74) *Attorney, Agent, or Firm*—Paul Vincent

(57) ABSTRACT

A device for moving a pig through a conduit, such as a pipeline, is proposed, comprising at least one pulling element with at least one sealing means. The sealing means comprises a supporting structure with variable circumference with at least one sealing element disposed on the circumference of the supporting structure. In a preferred embodiment, the supporting structure comprises supporting arms disposed substantially radially and being pivotable about axes, each perpendicular to the longitudinal central axis of the pulling element, and is mounted to the pulling element via the supporting structure and a central sleeve which can be fixed to the pulling element.

26 Claims, 5 Drawing Sheets

DEVICE FOR MOVING A PIG THROUGH A CONDUIT, SUCH AS A PIPELINE, AND SEALING MEANS FOR A DEVICE OF THIS TYPE

BACKGROUND OF THE INVENTION

The invention concerns a device for moving a pig through a conduit, such as pipeline, comprising at least one pulling element having at least one sealing means, and a sealing means for such a device.

Conventional devices of this kind are used e.g. for cleaning or checking for leaks in conduits, such as pipelines, wherein the pulling element, is suitable for receiving a cleaning or a measuring means by providing the generally cylindrical pulling element with such a means or by coupling such means to the pulling element to be pulled along therewith. In order for the medium transported in the conduit to drive the pulling element the pulling element comprises, in general, at least one sealing means which abuts on the inside of the conduit and, at the same time, provides central guidance of the pulling element along the longitudinal central axis of the conduit.

The diameter of the sealing means thereby corresponds substantially to the standard width of the corresponding conduit such that several of these devices are required to control conduits of various standard widths. If a conduit comprises portions with varying cross-sections, such as widening or narrowing parts, or branches, in particular T- or Y-shaped branches, it is generally not possible to guide pigs through such conduits.

It is the underlying purpose of the present invention to further develop a device of the above mentioned kind such that a pig can be moved through conduits of varying cross-sections thereby ensuring sealing between the sealing means and the inner pipe wall.

SUMMARY OF THE INVENTION

In accordance with the invention, this object is achieved with a device of the above mentioned kind in that the sealing means comprises a supporting structure with variable circumference having at least one sealing element, disposed at the circumference of the supporting structure and made from a flexible material.

In the device in accordance with the invention, the supporting structure with variable circumference permits use of the device in conduits of various cross-sections and, in particular, in conduits whose cross-sections narrow or widen. The sealing element disposed at the circumference of the supporting structure can be deformed to ensure sealing between the sealing element and the inner pipe wall to maintain abutment on the inner pipe wall and therefore sealing within the range of cross-sectional conduit areas for which the device is to be used.

A variant of this embodiment thereby comprises several partially-cylindrical sealing sections, disposed one next to the other in the circumferential direction and communicating with each other via the lateral end regions of their outer sides, which are either individually firmly connected to one another to form the annular sealing element or form same as a single piece. The radius of the partially-cylindrical sealing sections in this embodiment, made from a flexible material, can vary in dependence on the cross-section of the conduit or on the corresponding circumference of the supporting structure, wherein the abutting or pressed-together lateral end regions of the sealing sections always guarantee good sealing.

In accordance with a further embodiment, a sealing ring is provided which is formed from a single piece and corrugated in the circumferential direction, and which can be folded in dependence on the cross-section of a conduit or of the corresponding circumference of the supporting structure to always abut against the inner pipe wall. The sealing ring can e.g. be formed such that it is not or only slightly corrugated for the largest pipe width of the device or for the largest circumference of the supporting structure, and such that it is strongly corrugated for the smallest possible circumference of the supporting structure.

The sealing element is preferably made from a polymer, in particular, polyurethane, due to its high wear resistance.

The sealing means preferably comprises a sealing diaphragm which extends from the sealing element(s) disposed at the circumference of the supporting structure, radially towards the pulling element to which it can be mounted e.g. in any arbitrary fashion. The sealing diaphragm is preferably disposed at the radially inward side of the sealing element. In a preferred embodiment, the sealing element and the sealing diaphragm are firmly connected to each other. For a one-piece sealing element in the form of a sealing ring, the sealing ring and the diaphragm can, optionally, also be formed from a single piece.

The sealing means is preferably bowl-shaped and extends in a convex fashion towards the drawing direction of the pulling element, wherein the convex shape of the sealing means increases, the narrower the conduit or the smaller the variable circumference of the supporting structure. In this case, the sealing diaphragm is also bowl-shaped and extends in a convex fashion in the same direction as the convexity of the sealing means to adapt to cross-sectional changes of a conduit.

The sealing diaphragm preferably comprises a flexible texture formed, in particular, of net-like interwoven bands, fixed e.g. via loops at the ends to the supporting structure, and can comprise e.g. axially and also radially extending bands, wherein either several partially-cylindrical sealing elements or a one-piece sealing ring is connected to the radially extending bands. The texture of sewn up bands forming the diaphragm is preferably made from a polymer, in particular a polyamide, such as nylon, perlon or the like.

The supporting structure of variable circumference advantageously comprises supporting arms which are arranged substantially radially and are pivotable about axes, extending perpendicular to the longitudinal central axis of the pulling element. The sealing element(s) is/are hinged in a pivotable fashion to the outer ends of the supporting arms. Such pivotable mounting to the supporting arms enables, in particular, passage of the inventive device through pipe bends without damaging the sealing element, while assuring that the sealing elements abut the inner pipe wall to maintain good sealing.

The supporting arms of the supporting structure are preferably biased radially outwardly via of a spring force, wherein the sealing means automatically adapts to conduits of varying cross-section. The supporting arms are biased radially outwardly by appropriate substantially equal spring forces to simultaneously guarantee central guidance of the pulling element, a cleaning means, a measuring means or other members connected to the pulling element. Such a supporting arm can e.g. be biased radially outwardly via a disk spring set.

Each supporting arm preferably comprises a roller at its outer end for guidance along the inner wall of a conduit such that the sealing element(s), mounted e.g. via pivotable receptacles disposed at the outer ends of the supporting arms, can be pressed with a predeterminable force against the inner pipe wall to reduce friction on the inner pipe wall and associated wear.

To prevent damage to a conduit and to a supporting arm, in particular in pipe bends, each supporting arm preferably comprises a supporting roller in the region of its pivot axis for support on the inner wall of the pipe, wherein, at least for pipes of small cross-section, at least some of the supporting arms can assume extreme positions substantially parallel to the longitudinal central axis of the pipe.

A further development of the inventive device provides that the supporting arms are synchronized. As a result thereof, the device is also suitable for conduits or pipelines comprising branches, (e.g. Y- or T-shaped) since, during passage of a sealing means through such branches, those radially outwardly biased supporting arms which do not experience any counter pressure from the inner pipe wall due to the branching, are held by neighboring supporting arms which abut on the inner pipe wall opposite to the branch such that the free supporting arms cannot spring out radially, thereby reliably preventing damage to the sealing element and/or the diaphragm. Preferably, each pair of neighboring supporting arms are synchronized to thereby ensure maintenance of an angle with respect to the longitudinal central axis of the pulling element, which varies between 1° and 5°, in particular between 2° and 3°.

The supporting arms can comprise e.g. pins extending at a separation from and parallel to their pivot axes, wherein the ends of each pair of facing pins of neighboring supporting arms protrude into a common holding means to guarantee limited relative motion of the pins, wherein the limited relative motion corresponds, in particular, to an angular difference of between 1° and 5° in the angles between the respective supporting arms and the longitudinal central axis of the pulling element. The holding means may e.g. be formed by clamps.

Alternatively, the supporting arms can alternately comprise one and two guiding plates at a separation from their pivot axes, wherein each of the guiding plates of a supporting arm engages between the two guiding plates of the neighboring supporting arm to thereby ensure limited relative motion. Instead of alternately providing the supporting arms with one and two guiding plates, each supporting arm can comprise, at a separation from the pivot axis, one guiding plate directed towards the one neighboring supporting arm and two guiding plates directed towards the other neighboring supporting arm, wherein the guiding plate directed towards the one neighboring supporting arm engages between the two guiding plates of the neighboring supporting arm to thereby ensure limited relative motion.

Tests have shown that it is advantageous when the supporting structure comprises twelve supporting arms to ensure good guidance of the pulling element along a conduit and good sealing of both the sealing element supported by the supporting structure and of the diaphragm, optionally provided on the sealing element(s).

In a preferred embodiment, the supporting structure is mounted to the pulling element via a central sleeve which can be fixed thereto. If the inventive sealing element comprises a sealing diaphragm, it is also preferably mounted to such a central sleeve.

To absorb transient pressure changes of the medium conveyed in the conduit, so-called shock waves, the central sleeve is fixed to the pulling element, preferably with limited axial displacement such that the inventive sealing means can axially move in response to such a shock wave, to prevent, in particular, damage to the sealing element and diaphragm. The central sleeve is preferably fixed to the pulling element in a manner axially displaceable in opposition to a spring force.

In a further preferred embodiment, the central sleeve is fixed to the pulling element in a radially pivotable fashion, in particular via a ball and socket joint. This facilitates passage through pipe bends, in particular, of devices comprising several sealing means disposed on a pulling element, in that at least some of the sealing means can be pivoted with respect to the pulling element and thereby are always disposed substantially perpendicular to the longitudinal central axis of the conduit, wherein the supporting structure of the sealing means thereby maintains a substantially circular cross-section to reduce wear of the sealing elements and maintain good sealing.

A preferred embodiment provides at least two sealing means disposed on a pulling element, at least one of which can be radially pivoted on the pulling element. In a device having a pulling element comprising two sealing means, both sealing means may be radially pivotable, or only one sealing means may be radially pivotable and the other not. In general, the inventive device comprises three or four sealing means of which e.g. the central one is disposed on the pulling element in a radially pivotable fashion and the others are stationary. The inventive device can, of course, also comprise several such sealing means, wherein in a device with e.g. five sealing means, the second and the fourth sealing means could be radially pivotable on the pulling element, whereas the first, third and fifth sealing means could be disposed in a radially fixed manner. As mentioned above, all sealing means are disposed on the pulling element in an axially displaceable manner, independent of whether or not they are pivotable.

The invention also concerns a sealing means in a device for moving a pig through a conduit, such as a pipeline, which comprises at least one of the above mentioned features.

The invention is described in more detail below with respect to preferred embodiments and with reference to the drawings.

DESCRIPTION OF THE PREFERRED EMBODIMENT

Figure 1:
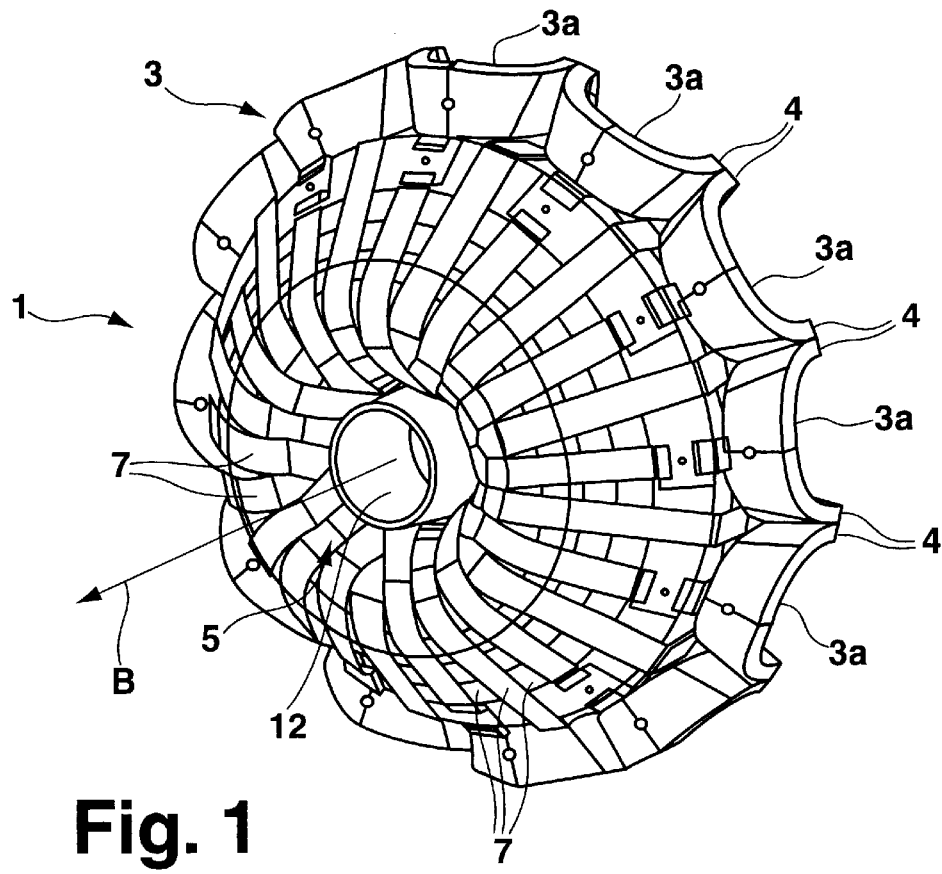
FIG. 1 shows a perspective view of a sealing means of an inventive device with partially-cylindrical sealing elements, without supporting structure.

FIG. 1 shows an inventive sealing means 1 without the associated supporting structure, for reasons of clarity. A sealing element 3 consists of several partially-cylindrical sealing sections 3a disposed next to one another in the circumferential direction and communicating with one another via the lateral end regions 4 of their outer sides, and being connected to a sealing diaphragm 5 at their radially inner sides. The sealing diaphragm 5 is disposed on a central sleeve 12 to be mounted to a pulling element (not shown). The sealing diaphragm 5 comprises a texture of bands 7 made from a polyamide, e.g. nylon, disposed in the radial and also circumferential direction, fastened, in particular, via loops at the ends of a supporting structure (not shown). It is covered by a continuous layer consisting e.g. of kevlar coated with polyurethane. The sealing sections 3a disposed at the circumference of the supporting structure (not shown) consist of a flexible material, e.g. of polyurethane, and can be deformed in dependence on the circumference of the sealing means 1, with the diameter of the partially-cylindrical sealing sections 3a being reduced e.g. by compression. The diaphragm 5, consisting of bands 7 sewn to each other, is also flexible and substantially bowl-shaped, wherein the convex shape of the diaphragm faces in the direction of motion of the sealing means 1 (arrow B).

Figure 2:
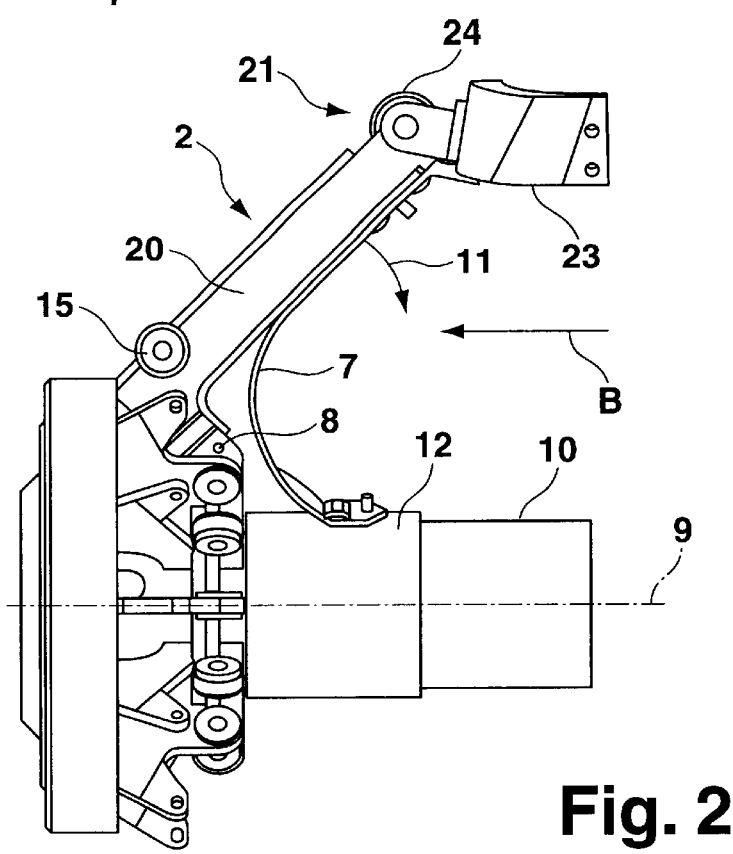
FIG. 2 shows a side view of a supporting structure of a sealing means in accordance with FIG. 1.
Figure 2A:
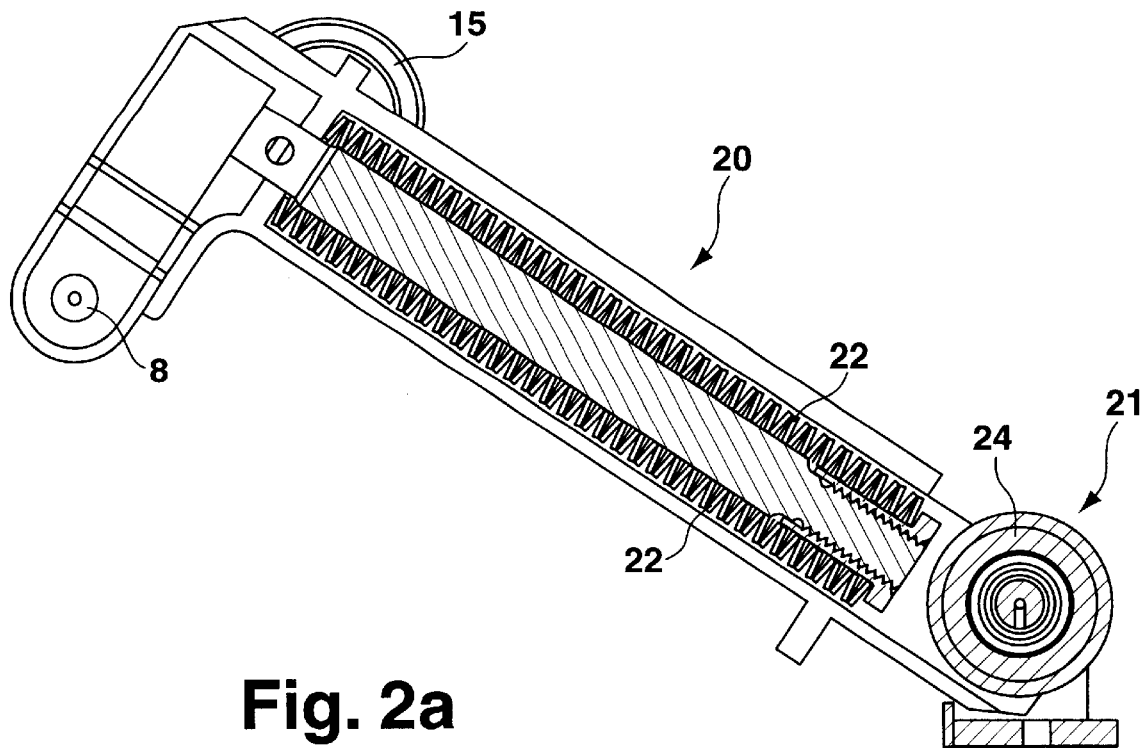
FIG. 2a shows a longitudinal section of a supporting arm of the supporting structure in accordance with FIG. 2.
Figure 3:
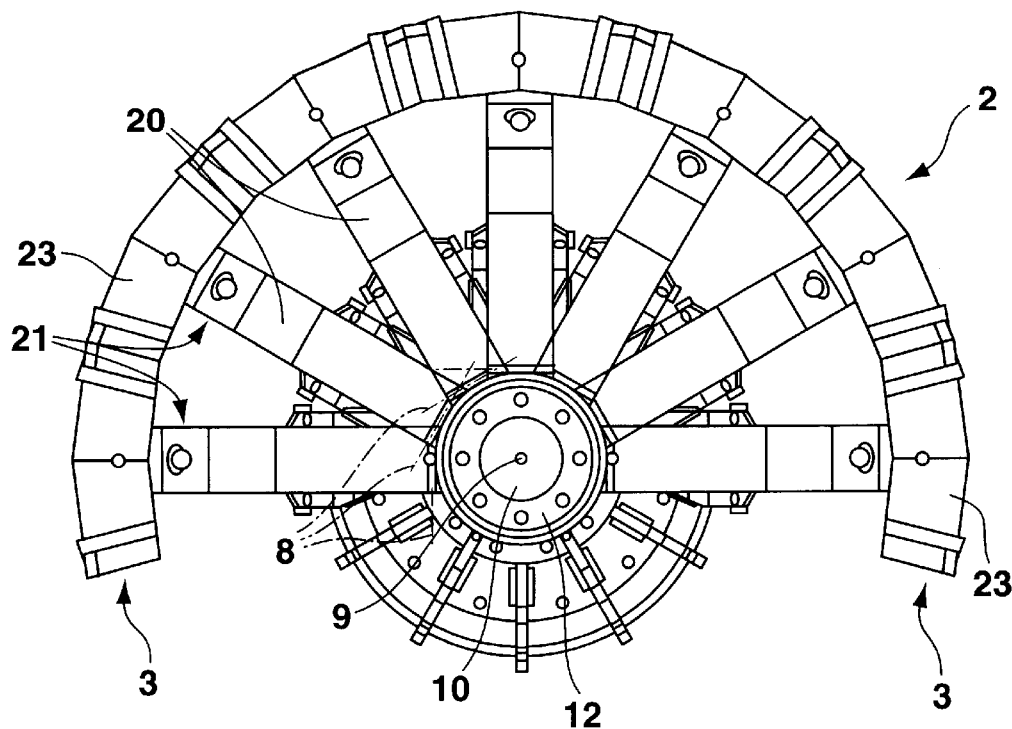
FIG. 3 is a top view of the supporting structure according to FIG. 2.

FIG. 2 shows the supporting structure 2 of such a sealing means 1. The supporting structure 2 comprises twelve supporting arms 20 disposed substantially radially and being pivotable about axes 8 extending perpendicular to the longitudinal central axis 9 of a pulling element 10, of which one is shown, by way of example, in FIG. 2a. Each supporting arm 20 is biased radially outwardly by means of a disc spring set 22. Other springs, such as helical springs can also be used. The supporting arm 20 is fixed to the pulling element 10 at a central sleeve 12 which can be axially displaced, in particular, in opposition to a spring force. The sleeve 12 can also be fixed to the pulling element 10 in a non-displaceable manner. The outer end 21 of each supporting arm 20 comprises a receptacle 23 for a sealing section 3a (not shown) in accordance with FIG. 1, wherein the receptacle 23 is hinged to the supporting arm 20 in a pivotable fashion. A roller 24 is disposed coaxially to the pivot axis of the receptacle 23 for guidance along the inner wall of a conduit. The supporting arm 20 comprises a supporting roller 15 in the region of its pivot axis 8 to provide additional support for the supporting arm 20, in particular, when pivoting the supporting arm 20 in the direction of the arrow 11 to an extreme position (as can e.g. occur at the inner wall of pipe bends of particularly narrow cross-section) in which the supporting arm 20 is disposed substantially parallel to the longitudinal central axis 9 of the pulling element. FIG. 3 is a top view of such a supporting structure.

Figure 4:
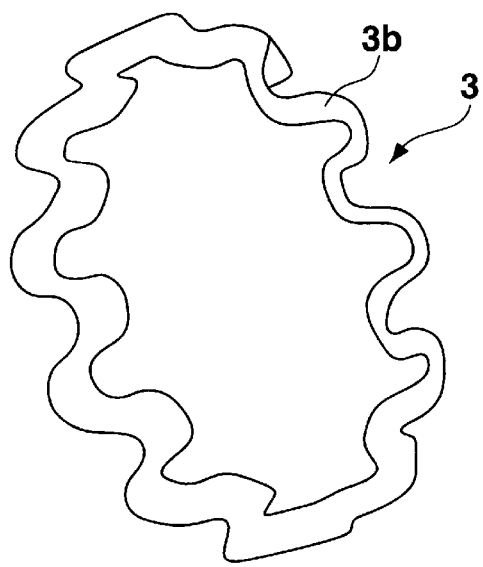
FIG. 4 is a sealing ring, formed as a single piece, of an inventive sealing means.

FIG. 4 shows an alternative embodiment of the partially-cylindrical sealing elements 3a according to FIG. 1, in the form of a one-piece sealing ring 3b, corrugated in the circumferential direction. The sealing ring 3b is also made from a flexible material, e.g. polyurethane.

Figure 5:
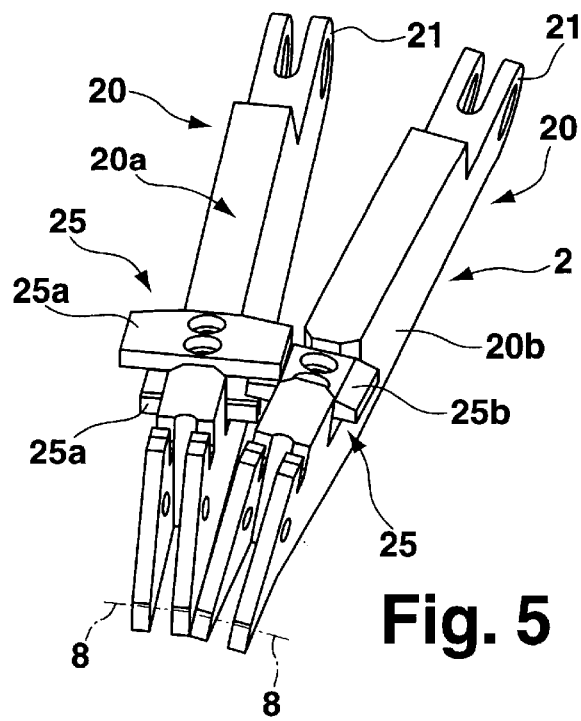
FIG. 5 is a perspective view of two neighboring supporting arms, synchronized by means of guiding plates.

FIG. 5 shows an embodiment for synchronizing neighboring supporting arms 20 of a supporting structure 2, pivotable in each case about a pivot axis 8. The supporting arms 20 alternately comprise one and two guiding plates 25, at a separation from their pivot axes 8, wherein each guiding plate 25 of a supporting arm 20—in this case the guiding plate 25b of the right supporting arm 20b—engages between two guiding plates 25 of the neighboring supporting arm 20—in this case the guiding plates 25a of the left supporting arm 20a—thereby ensuring a limited relative motion between the neighboring supporting arms 20a, 20b. The supporting arms 20 are synchronized e.g. by maintaining angles (not shown) relative to the longitudinal central axis of the pulling element, which differ by between 1° and 5°, in particular between 2° and 3°. This prevents individual supporting arms 20 from springing out in pipe branches to damage the sealing element and/or diaphragm.

Figure 6:
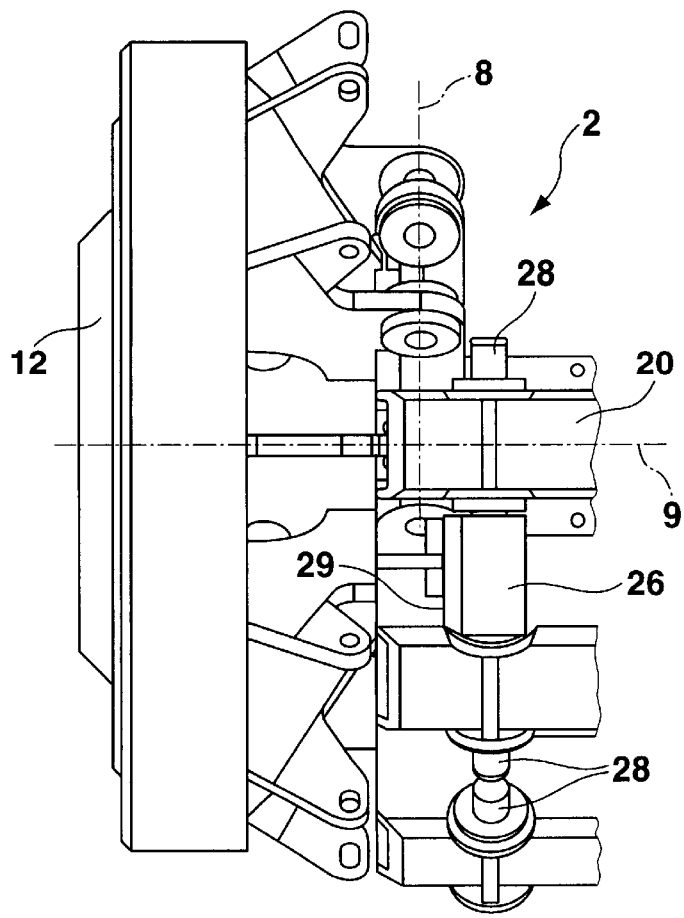
FIG. 6 is a side view of a supporting structure comprising supporting arms, synchronized by means of pins projecting into holding means.
Figure 7:
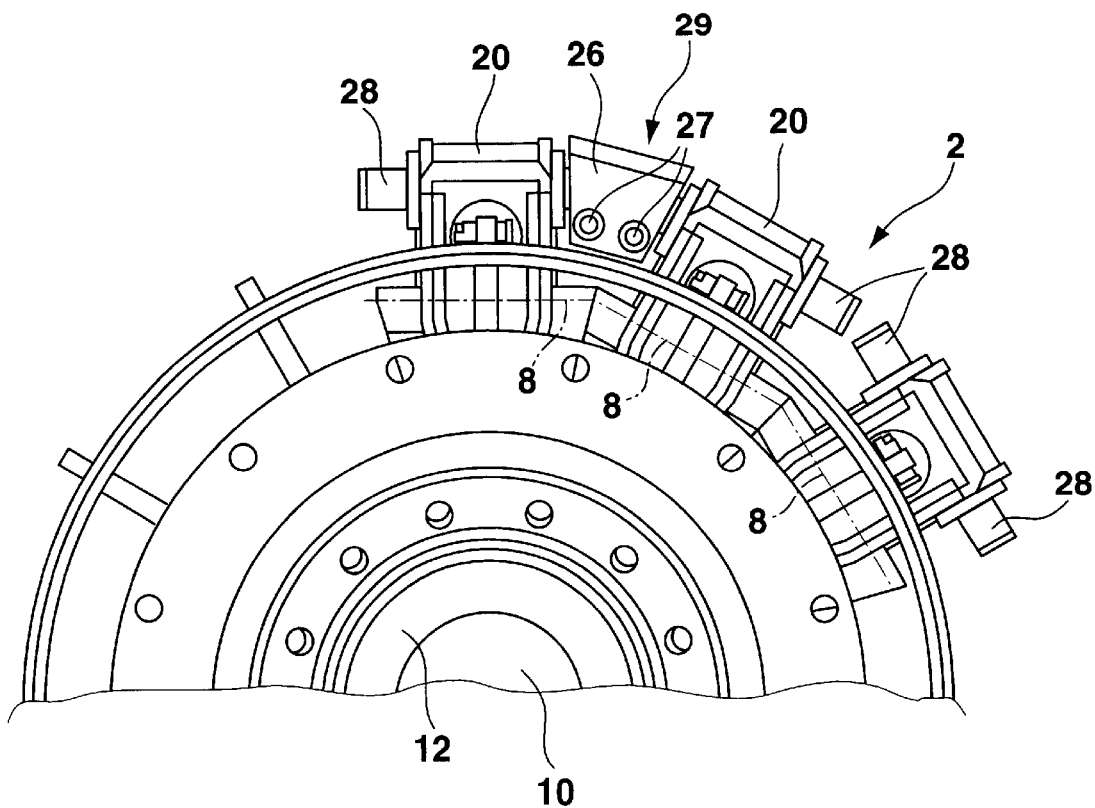
FIG. 7 is a top view of a supporting structure in accordance with FIG. 6.
Figure 8:
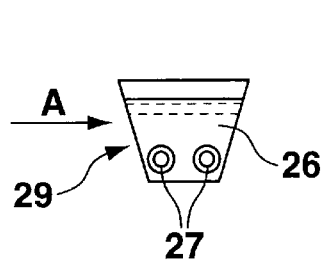
FIG. 8 is a side view of a holding means in accordance with FIGS. 6 and 7.
Figure 9:
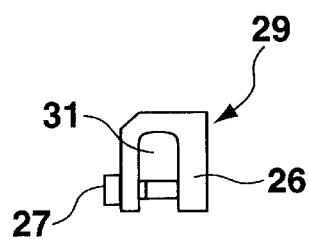
FIG. 9 is a side view of the holding means in accordance with FIG. 8, in the direction of arrow A.

An alternative to synchronization of neighboring supporting arms 20 is shown in the side view of FIG. 6 and in the front view of FIG. 7. Each supporting arm 20 is provided, at a separation from its pivot axis 8, with pins 28 extending parallel thereto, wherein the ends of two pins 28 of neighboring supporting arms 20, facing one another, project into a common holding means 29 which permits limited relative motion of the pins 28. The holding means is designed as a clamp 26 in the embodiment shown. The clamp 26 is e.g. substantially U-shaped and its open end is closed by helical bolts 27, wherein the pins 28 project into the hollow space 31 of the holding means 29 formed by the U-shaped clamp 26 and the helical bolts 27 and can exercise a limited relative motion leading to a limited deviation of the angles of two neighboring supporting arms relative to the longitudinal central axis of the pulling element 10.

Figure 10:
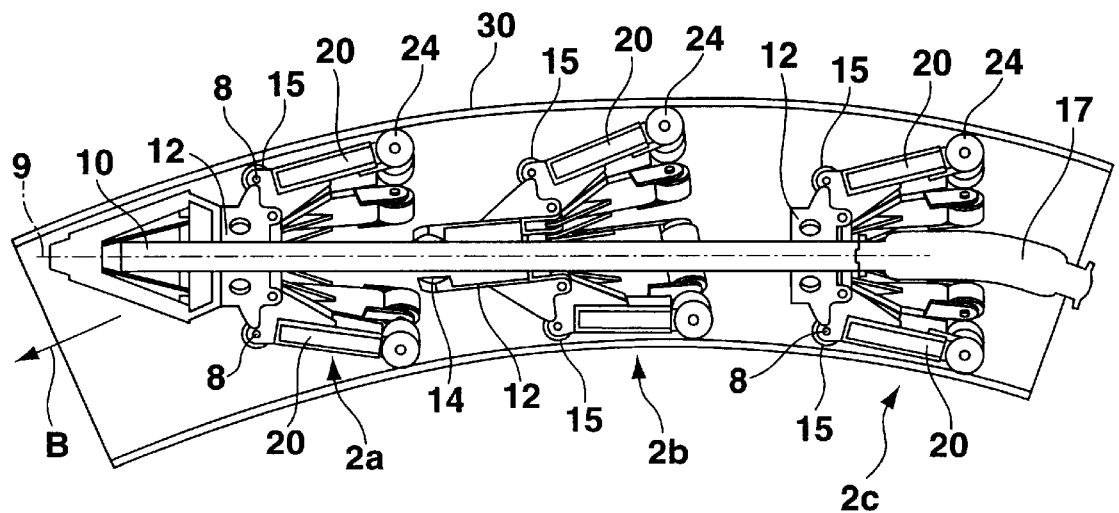
FIG. 10 is a schematic view of a device comprising three sealing means for illustrating the passage through a pipe bend.

FIG. 10 shows an embodiment of an inventive device comprising three supporting structures 2a, 2b, 2c of three sealing means disposed on a pulling element 10, wherein the sealing elements and diaphragms are not shown for reasons of clarity. The central supporting structure 2b of the device moved through a bent conduit 30 in the direction of arrow B is fixed, via a central sleeve 12 and a ball and socket joint 14, in a radially pivotable fashion to the pulling element 10 to allow passage of the device through the bent pipe 30 in the direction of the arrow B. All supporting structures 2a, 2b, 2c are mounted to the pulling element 10 in an axially displaceable manner. The lower supporting arm 20 of the supporting structure 2c disposed directly upstream of a coupling means 17 is in an extreme position, disposed nearly parallel to the longitudinal central axis 9 of the pulling element 10 and is guided on the inner wall of the conduit 30 by a supporting roller 15 disposed in the region of its pivot axis 8.

Figure 11:
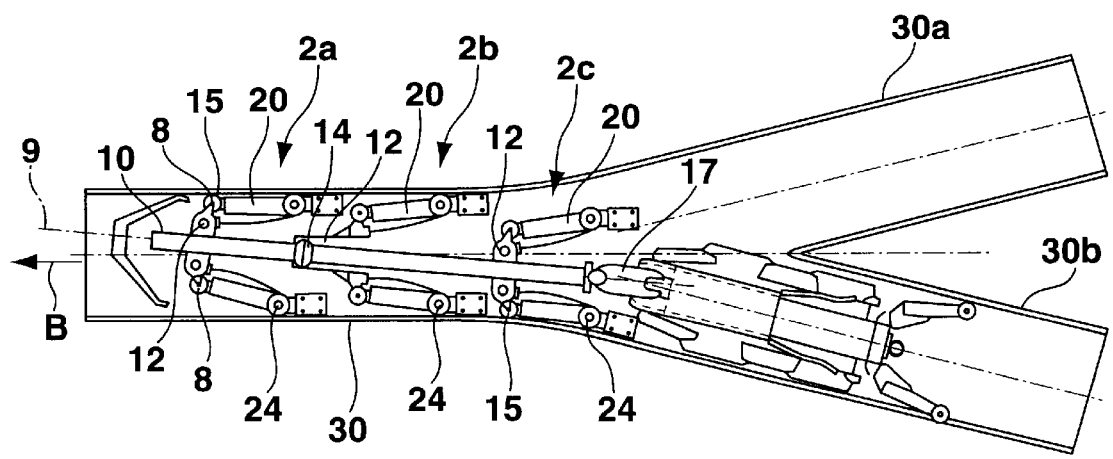
FIG. 11 is a schematic view of the device in accordance with FIG. 10 for illustrating passage through a Y-shaped pipe branch.

As shown in FIG. 11, the supporting arms 20 of the supporting structures 2a, 2b, 2c are synchronized such that, during passage of the device through a pipe branch 30a, 30b, the supporting arms 20—in the example shown, the upper supporting arm 20 of the supporting structure 2c—do not spring out radially such that the sealing elements or diaphragms (not shown) are not damaged.

LIST OF REFERENCE NUMERALS 1 sealing means
2 supporting structure
3 sealing element
3a partially-cylindrical sealing element
3b sealing ring corrugated in the circumferential direction
4 lateral end region of the partially-cylindrical sealing element
5 sealing diaphragm 7 bands
8 perpendicular to the longitudinal central axis of the pulling element
9 longitudinal central axis of the pulling element
10 pulling element
12 central sleeve
14 ball and socket joint
15 supporting roller
17 coupling means
20 supporting arm
21 outer end of the supporting arm
22 disc spring set
23 receptacle for sealing element
24 roller
25 guiding plate
26 clamp
27 bolt
28 pins
29 holding means
30 conduit
31 hollow space of the clamp

We claim:

1. A device for moving a pig through a conduit, the device comprising:
    a pulling element;
    a support structure communicating with said pulling element, said support structure having a variable circumference; and
    at least one sealing element disposed on said variable circumference of said support structure, said sealing element made from a flexible material, wherein said sealing element comprises a plurality of partially-cylindrical sealing sections disposed next to one another in a circumferential direction and communicating with each other at lateral end regions of their outer sides.

2. The device of claim 1, wherein said sealing element comprises a sealing ring, formed as a single piece and corrugated in a circumferential direction.

3. The device of claim 1, wherein said sealing element comprises one of a polymer and a polyurethane.

4. The device of claim 1, further comprising a sealing diaphragm, disposed radially inwardly of said sealing element.

5. The device of claim 4, wherein said sealing element and said sealing diaphragm are firmly connected to one another.

6. The device of claim 4, wherein said sealing diaphragm is bowl-shaped with a convex form oriented in a same direction as a convex shape of said sealing element.

7. The device of claim 4, wherein said sealing diaphragm comprises a flexible texture.

8. The device of claim 7, wherein said texture is formed of net-like interwoven bands.

9. The device of claim 4, wherein said sealing diaphragm is made from one of a polymer and a polyamide.

10. The device of claim 1, wherein said support structure comprises supporting arms disposed substantially radially, each pivotable about a pivot axis oriented perpendicular to a longitudinal central axis of said pulling element.

11. The device of claim 10, wherein said sealing element is pivotably hinged at outer ends of said supporting arms.

12. The device of claim 10, wherein said supporting arms are biased radially outwardly by a spring member.

13. The device of claim 12, wherein said spring member comprises a disc spring set.

14. The device of claim 10, wherein each of said supporting arms comprises a roller at an outer end thereof for guidance along an inner wall of the conduit.

15. The device of claim 10, wherein each of said supporting arms comprises a supporting roller in a region of said pivot axis for support on an inner wall of pipe bends.

16. The device of claim 10, further comprising means for synchronizing said supporting arms.

17. The device of claim 16, wherein said synchronizing means synchronize all pairs of neighboring supporting arms to maintain angles relative to said longitudinal central axis of said pulling element which vary between one of 1° to 5° and 2° to 3°.

18. The device of claim 16, wherein said synchronizing means comprise pins mounted to said supporting arms and extending parallel to and at a separation from said pivot axis, said synchronizing means also comprising a common holding means, wherein each pin pair of neighboring supporting arms projects, with facing ends, into said common holding means to limit a relative motion of said pins.

19. The device of claim 18, wherein said common holding means comprise clamps.

20. The device of claim 16, wherein said synchronizing means alternately comprise one and two guiding plates mounted to said supporting arms and disposed at a separation from said pivot axis, wherein one guiding plate of a supporting arm engages between two guiding plates of a neighboring supporting arm to ensure limited relative motion.

21. The device of claim 16, wherein said synchronizing means comprise one guiding plate mounted to each of said supporting arms at a separation from said pivot axis and oriented in a direction towards a first neighboring supporting arm, said synchronizing means further comprising two guiding plates mounted to each of said supporting arms and oriented in a direction of a second neighboring supporting arm, wherein said one guiding plate oriented towards said first neighboring supporting arm engages between said two guiding plates of said first neighboring supporting arm to thereby ensure limited relative motion.

22. The device of claim 1, further comprising a central sleeve mounted to said pulling element, wherein said support structure is mounted to said central sleeve.

23. The device of claim 22, wherein said central sleeve is mounted to said pulling element in a radially pivotable fashion.

24. The device of claim 23, wherein said central sleeve is mounted to said pulling element via a ball and socket joint.

25. The device of claim 1, wherein said support structure can be radially pivoted on said pulling element.

26. A sealing means for moving a pig through a conduit by means of a pulling element, the sealing means comprising:
    a support structure communicating with the pulling element, said support structure having a variable circumference; and
    at least one sealing element disposed on said variable circumference of said support structure, said sealing element made from a flexible material, wherein said sealing element comprises a plurality of partially-cylindrical sealing sections disposed next to one another in a circumferential direction and communicating with each other at lateral end regions of their outer sides.

* * * * *